(12) United States Patent
Hartley (10) Patent No.: US 7,097,444 B2
(45) Date of Patent: Aug. 29, 2006

(54) PART CATCHER

(75) Inventor: Gary L. Hartley, North Fairfield, OH (US)

(73) Assignee: Berry Plastics Corporation, Evansville, IN (US)

(*) Notice: Subject to any disclaimer, the term of this patent is extended or adjusted under 35 U.S.C. 154(b) by 225 days.

(21) Appl. No.: 10/804,901

(22) Filed: Mar. 19, 2004

(65) Prior Publication Data

US 2005/0208174 A1    Sep. 22, 2005

(51) Int. Cl.
B29C 45/40    (2006.01)
(52) U.S. Cl. .......................... 425/436 R; 425/436 RM; 425/556
(58) Field of Classification Search ........... 425/436 R, 425/436 RM, 556
See application file for complete search history.

(56) References Cited

U.S. PATENT DOCUMENTS

| | | | | | |
|---|---|---|---|---|---|
| 3,986,811 | A | * | 10/1976 | Gunnels, Jr. | 425/556 |
| 4,118,168 | A | * | 10/1978 | Rees et al. | 425/556 |
| 4,295,815 | A | * | 10/1981 | Eltvedt | 425/556 |
| 4,741,687 | A | * | 5/1988 | Eltvedt | 425/441 |
| 5,438,814 | A | | 8/1995 | Lovett | 53/75 |
| 5,439,634 | A | * | 8/1995 | North | 264/334 |
| 5,547,335 | A | | 8/1996 | Lovett | 414/795.6 |

* cited by examiner

Primary Examiner—Joseph S. Del Sole
Assistant Examiner—Emmanuel S. Luk
(74) Attorney, Agent, or Firm—Barnes & Thornburg LLP (57) ABSTRACT

An apparatus includes a mold machine and a part catcher. The mold machine is configured to mold a part and to discharge the part from the mold machine. The part catcher is arranged to catch the part discharged from the mold machine.

21 Claims, 10 Drawing Sheets

PART CATCHER

BACKGROUND

The present disclosure relates to apparatus for use with mold machines. More particularly, the present disclosure relates to apparatus adapted to handle parts discharged from mold machines.

Mold machines are used to mold material (e.g., plastics material) into parts. Once formed, the parts may then be discharged from the mold machine for further processing.

SUMMARY

According to the present disclosure, an apparatus comprises an injection mold machine and a part catcher. The injection mold machine includes a fixed unit and a movable unit arranged for movement relative to the fixed unit between a closed position closing the mold machine so that the fixed and movable units cooperate to form a mold cavity therebetween to mold material in the mold cavity into a part and an opened position opening the mold machine for discharge of the part therefrom. The part catcher is coupled to the fixed and movable units for movement relative thereto between a catch position arranged to catch a part discharged from the injection mold machine and a release position arranged to release the part caught by the part catcher in response to movement of the movable unit relative to the fixed unit between the closed and opened positions.

The part catcher includes a first hand, a second hand, and a hand coupler. The first hand is coupled to a fixed platen included in the fixed unit. The second hand is coupled to a movable platen included in the movable unit. The hand coupler is coupled to the first and second hands for pivotable movement of the first and second hands from the release position to the catch position in response to movement of the movable unit from the closed position to the opened position and for pivotable movement of the first and second hands from the catch position to the release position in response to movement of the movable unit from the opened position to the closed position. In the release position, the hands cooperate to form a release opening therebetween for the part to fall therethrough onto an underlying conveyor. The hands close the release opening when they move to the catch position.

Additional features of the apparatus will become apparent to those skilled in the art upon consideration of the following detailed description exemplifying the best mode of the disclosure as presently perceived.

BRIEF DESCRIPTION OF THE DRAWINGS

The detailed description particularly refers to the accompanying figures in which.

DETAILED DESCRIPTION

Figure 1:
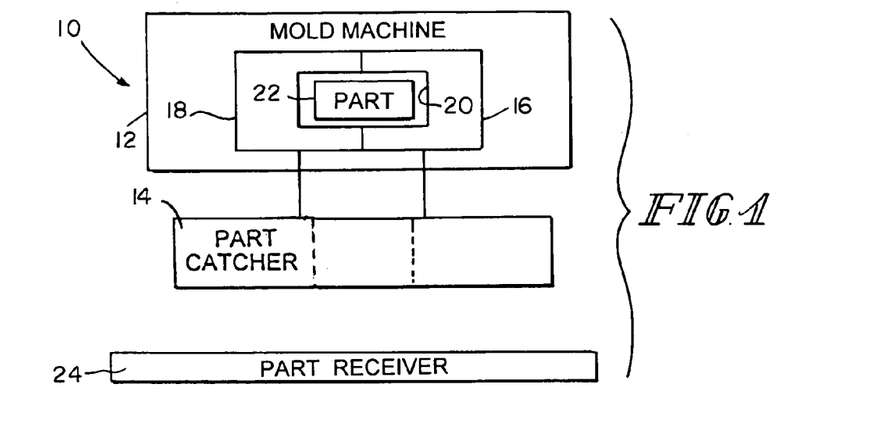
FIG. 1 is a diagrammatic view showing molding of a part in a mold cavity formed between first and second units included in a mold machine when the first and second units assume a closed position.
Figure 2:
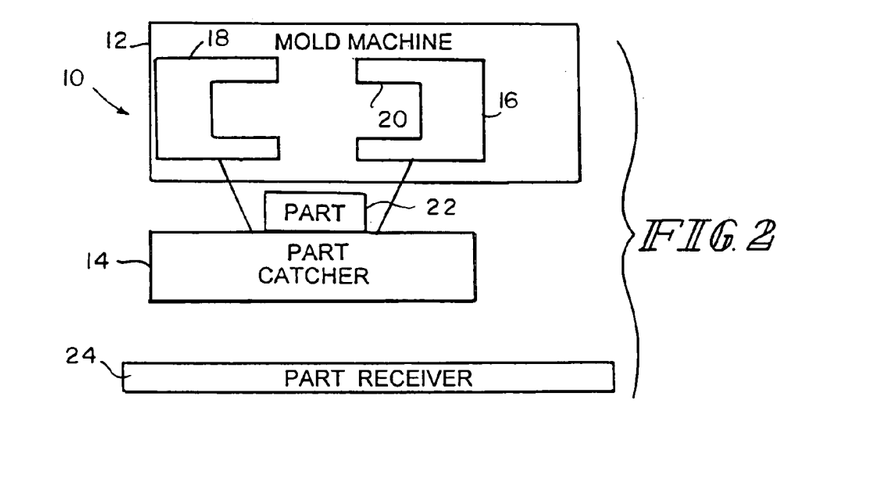
FIG. 2 is a diagrammatic view showing the first and second units assuming an opened position opening the mold machine for discharge of the part therefrom and showing a part catcher assuming a catch position to catch the part discharged from the mold machine in response to relative movement between the first and second units from the closed position to the opened position.
Figure 3:
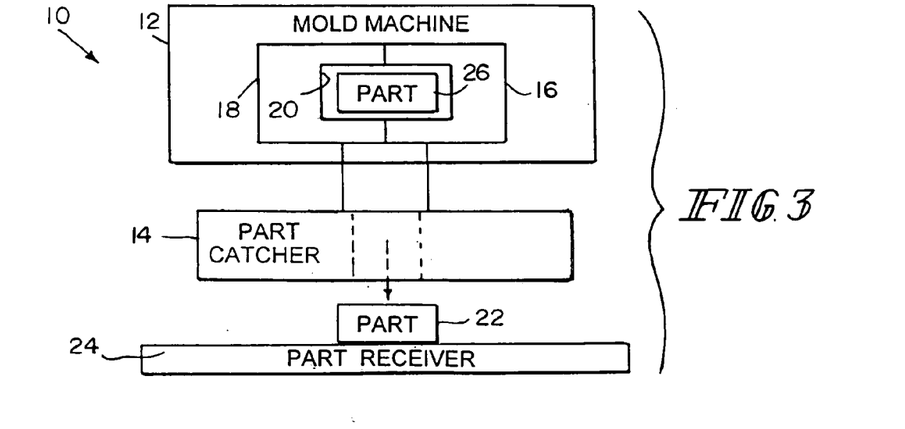
FIG. 3 is a diagrammatic view showing the part catcher assuming a release position to release the part to an underlying part receiver upon relative movement between the first and second units from the opened position back to the closed position.

An apparatus 10 includes a mold machine 12 and a part catcher 14, as shown diagrammatically, for example, in FIGS. 1–3. Mold machine 12 includes first and second units 16, 18 arranged for relative movement between one another between a closed position shown diagrammatically, for example, in FIG. 1 and an opened position shown diagrammatically, for example, in FIG. 2. In the closed position, units 16, 18 close mold machine 12 so that units 16, 18 cooperate to form a mold cavity 20 therebetween to mold material in mold cavity 20 into a part 22. In the opened position, units 16, 18 open mold machine 12 for discharge of part 22 therefrom.

Part catcher 14 is arranged to move between a catch position shown diagrammatically, for example, in FIG. 2 and a release position shown diagrammatically, for example, in FIG. 3. In the catch position, part catcher 14 is arranged to catch part 22 discharged from mold machine 12. In the release position, part catcher 14 is arranged to release part 22 caught by part catcher 14 to a part receiver 24 underling part catcher 14 while another part 26 is formed in mold cavity 20. Part catcher 14 is coupled to first and second units 16, 18 to move relative to units 16, 18 from the release position to the catch position in response to relative movement between units 16, 18 from the closed position to the opened position and to move relative to units 16, 18 from the catch position to the release position in response to relative movement between units 16, 18 from the opened position to the closed position. Movement of part catcher 14 between the catch and release positions causes no increase in the cycle time (i.e., the time to mold part 22, release part 22, and close again to mold part 26) of machine 12. Part catcher 14 thus provides catcher means for catching part 22 discharged from mold machine 12 (e.g., injection mold machine) when the catcher means is positioned in a catch position and for releasing part 22 to part receiver 24 when the catcher means is positioned in a release position.

Figure 4:
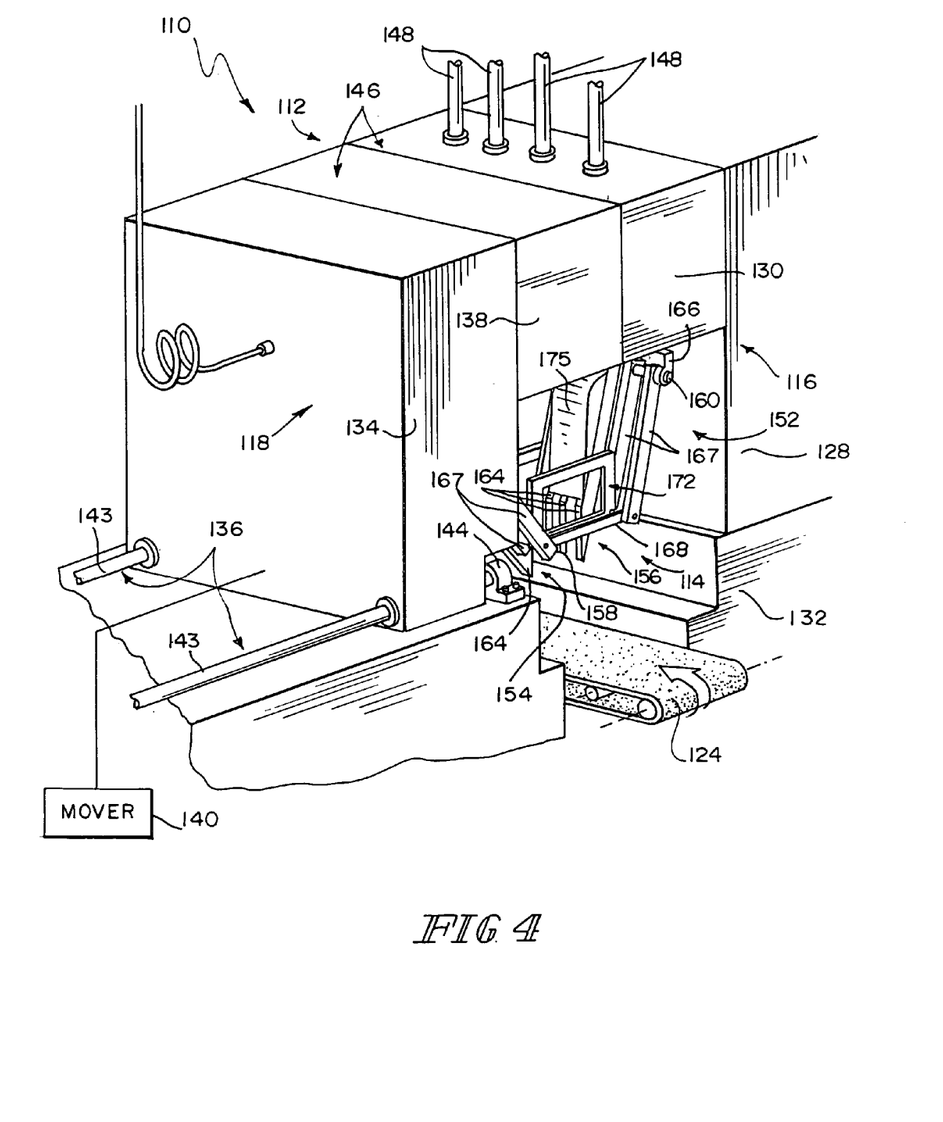
FIG. 4 is a perspective view showing an injection mold machine for molding a part (e.g., a bucket) and a part catcher coupled to fixed and movable units included in the injection mold machine for movement between a catch position shown, for example, in FIG. 8 to catch a part discharged from the injection mold machine and a release position shown, for example, in FIG. 10 to release the part to an underlying part receiver in response to movement of the movable unit relative to the fixed unit between a closed position shown, for example, in FIG. 7 and an opened position shown, for example, in FIG. 8.

An apparatus 110 is an example of apparatus 10 and is shown, for example, in FIG. 4. Apparatus 110 includes an injection mold machine 112 and a part catcher 114.

Figure 5:
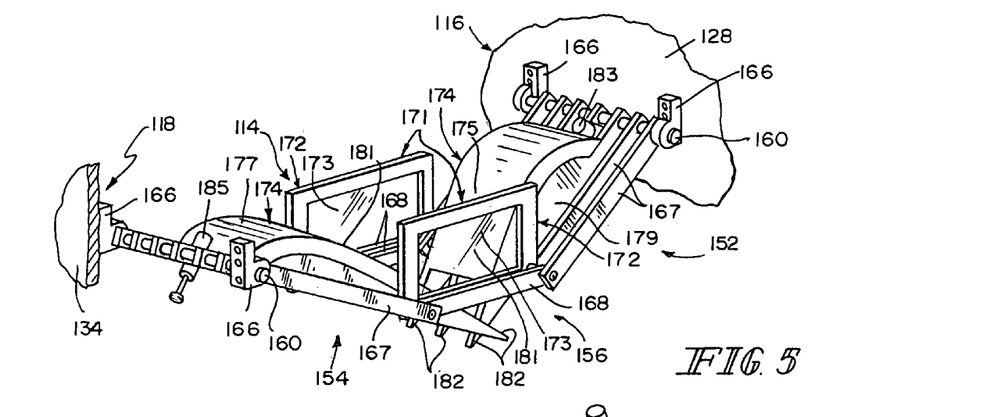
FIG. 5 is a perspective view of the part catcher of FIG. 4 in its catch position.
Figure 7:
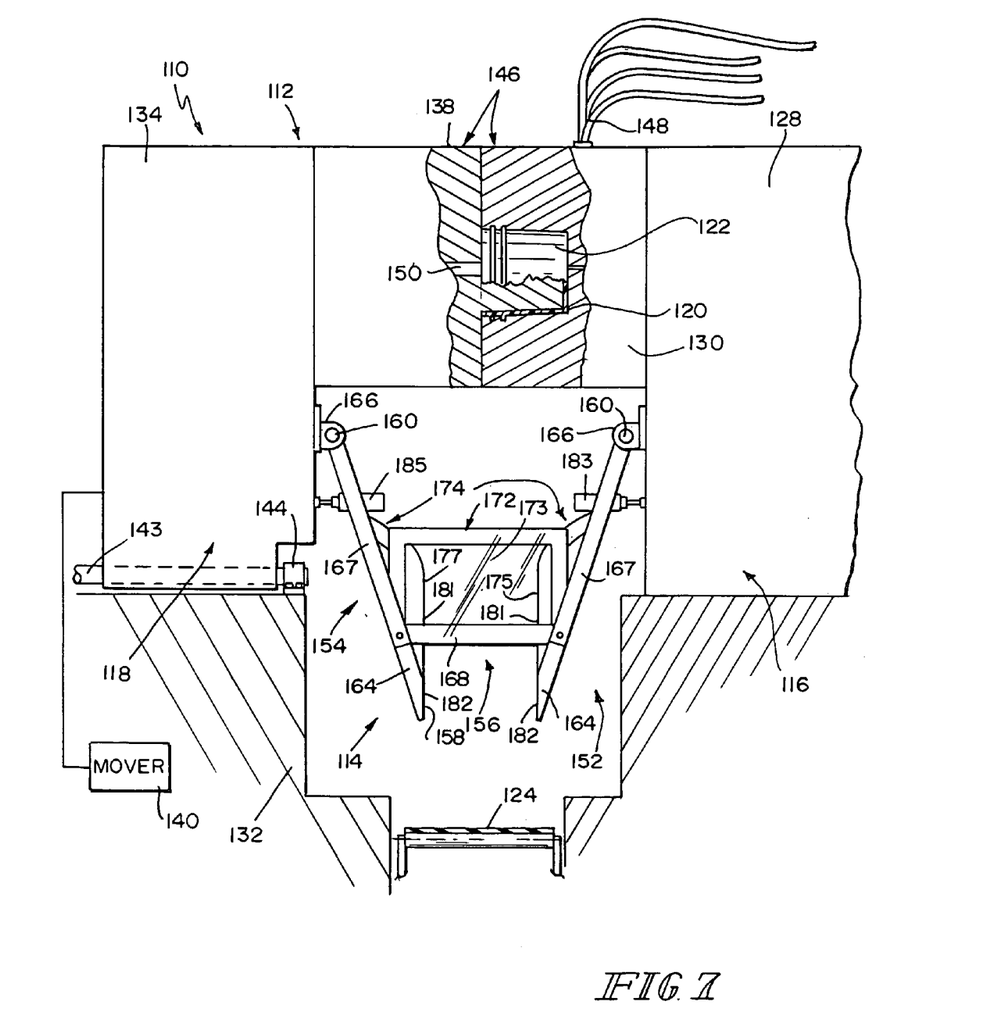
FIG. 7 is an elevation view of the injection mold machine, with portions broken away, showing the fixed and movable units in a closed position closing the injection mold machine so that the fixed and movable units cooperate to form a mold cavity therebetween to mold plastics material in the mold cavity into a part.
Figure 8:
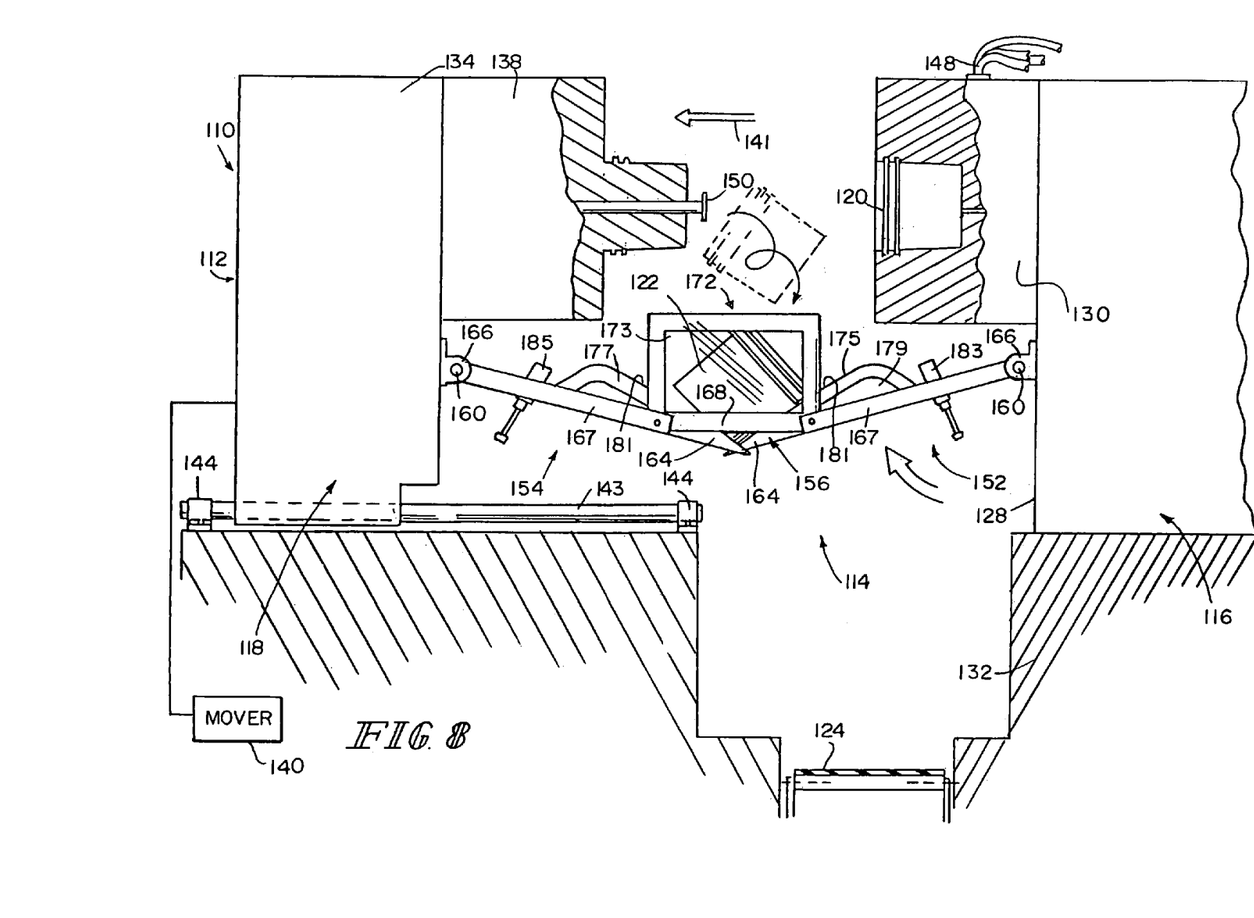
FIG. 8 is an elevation view of the injection mold machine, with portions broken away, showing the movable unit moved to assume an opened position opening the injection mold machine for discharge of the part therefrom and showing the part catcher moved to assume a catch position to catch the part discharged from the injection mold machine in response to movement of the movable unit to the opened position.
Figure 9:
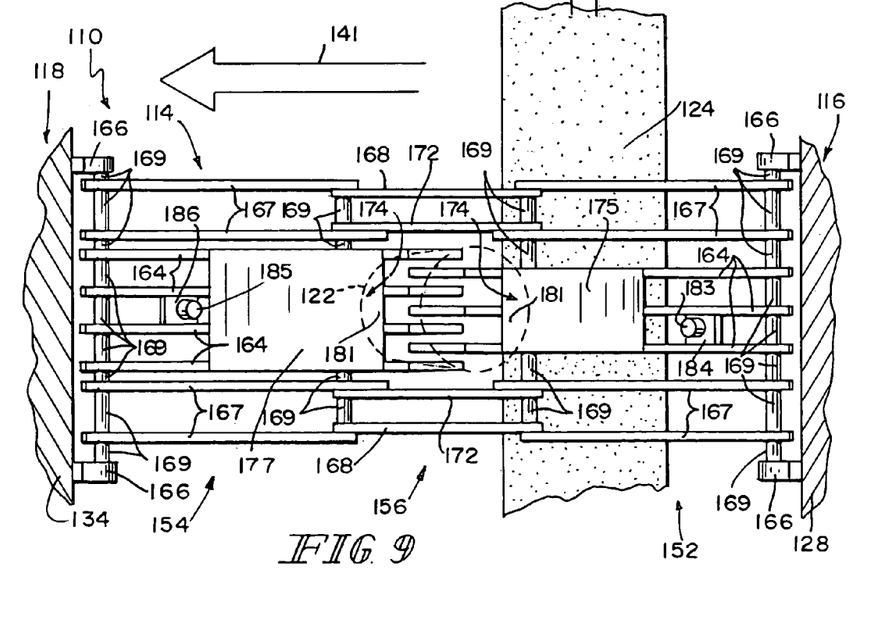
FIG. 9 is a plan view showing the part catcher of FIG. 8 in the catch position.

Injection mold machine 12 includes a fixed unit 116 and a movable unit 118 arranged to move relative to fixed unit 116 between a closed position shown, for example, in FIGS. 4, 7, 10, and 11 and an opened position shown, for example, in FIGS. 5, 8, and 9. In the closed position, fixed and movable units 116, 118 close injection mold machine 112 so that units 116, 118 cooperate to form a mold cavity 120 therebetween to mold material in mold cavity 120 into a part 122. In the opened position, units 116, 118 open mold machine 112 for discharge of part 122 therefrom.

Part catcher 114 is arranged to move between a catch position shown, for example, in FIGS. 5, 8, and 9 and a release position shown, for example, in FIGS. 4, 7, 10, and 11. In the catch position, part catcher 114 is arranged to catch part 122 discharged from injection mold machine 112. In the release position, part catcher 114 is arranged to release part 122 caught by part catcher 114 to a part receiver 124 (e.g., a conveyor) underlying part catcher 114 while another part 126 is formed in mold cavity 120. Part catcher 114 is coupled to fixed and movable units 116, 118 for movement relative to fixed and movable units 116, 118 from the release position to the catch position in response to movement of movable unit 118 relative to fixed unit 116 from the closed position to the opened position and to move relative to fixed and movable units 116, 118 from the catch position to the release position in response to movement of movable unit 118 relative to fixed unit 116 from the opened position to the closed position. Movement of part catcher 114 between the catch and release positions causes no increase in the cycle time of machine 112. Part catcher 114 thus provides catcher means for catching part 122 discharged from injection mold machine 112 when the catcher means is positioned in a catch position and for releasing part 122 to part receiver 124 when the catcher means is positioned in a release position.

Fixed unit 116 includes a fixed platen 128 and a fixed mold body 130, as shown, for example, in FIGS. 4, 7, 8, and 10. Fixed platen 128 is coupled to a foundation 132. Fixed mold body 130 is coupled to fixed platen 128.

Movable unit 118 includes a movable platen 134, a movable platen support 136, and a movable mold body 138, as shown, for example, in FIGS. 4, 7, 8, and 10. Movable platen 134 is coupled to movable platen support 136 for movement thereon between the closed and opened positions. Movable mold body 138 is coupled to movable platen 134 for movement therewith.

A mover 140 shown diagrammatically, for example, in FIGS. 4, 7, 8, and 10 is coupled to movable unit 118 to move movable unit 118 relative to fixed unit 116 between the closed and opened positions. Mover 140 is arranged to move movable unit 118 away from fixed unit 116 in an opening direction 141 from the closed position to the opened position, as shown, for example, in FIG. 8. Mover 140 is arranged to move movable unit 118 toward fixed unit 116 in a closing direction 142 from the opened position to the closed position, as shown, for example, in FIG. 10.

Illustratively, platen support 136 includes a pair of parallel slide rails 143 coupled to bearings 144 coupled to foundation 132, as shown, for example, in FIGS. 4, 7, 8, and 10. Slide rails 143 extend through movable platen 134 for movement of movable platen 134 along slide rails 143 in the opening and closing directions 141, 142 by use of mover 140.

Fixed and movable mold bodies 130, 138 cooperate to provide a mold 146 included in injection mold machine 112, as shown, for example, in FIG. 7. Bodies 130, 138 thus cooperate to form therebetween mold cavity 120 of mold 146 when bodies 130, 138 are positioned in the closed position. Illustratively, conduits 148 are coupled to fixed mold body 130 to supply plastics material to mold cavity 120 to form part 122 therein.

A part discharger 150 is arranged to discharge part 122 from movable mold body 138 upon movement of movable unit 118 from the closed position to the opened position, as suggested, for example, in FIG. 8.

Part catcher 114 includes a first hand 152, a second hand 154, and a hand coupler 156, as shown, for example, in FIGS. 5–11. First hand 152 is coupled to fixed unit 116 for movement relative thereto. Second hand 154 is coupled to movable unit 118 for movement relative thereto. Hand coupler 156 is coupled to first and second hands 152, 154 for movement of hands 152, 154 relative to one another and to fixed and movable units 116, 118 from the catch position to the release position in response to movement of the movable unit 118 toward fixed unit 116 from the opened position to the closed position and for movement of hands 152, 154 relative to one another and to fixed and movable units 116, 118 from the release position to the catch position in response to movement of the movable unit 118 away from fixed unit 116 from the closed position to the opened position. In the catch position, hands 152, 154 cooperate to catch part 122 discharged from mold cavity 120. In the release position, hands 152, 154 cooperate to form a release opening 158 therebetween for movement therethrough of part 122 to part receiver 124. Hands 152, 154 close release opening 158 upon movement back to the catch position. Illustratively, first and second hands 152, 154 and hand coupler 156 cooperate to provide a linkage coupled to units 116, 118 for pivotable movement relative thereto between the catch and release positions to open and close release opening 158.

Figure 6:
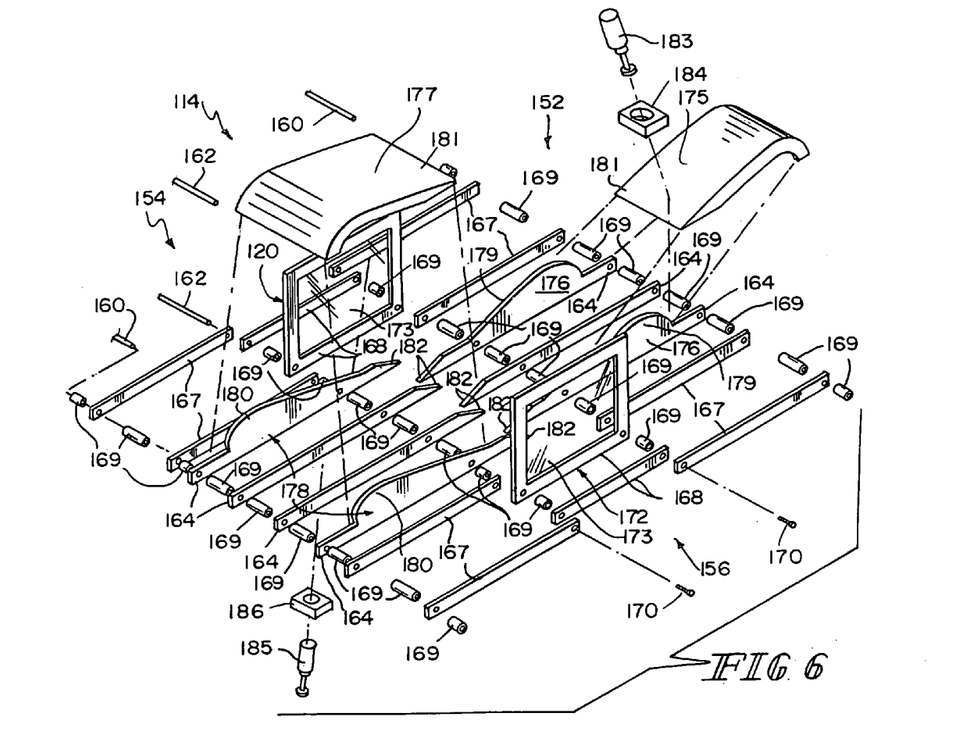
FIG. 6 is an exploded perspective view of the part catcher of FIG. 5.

Each hand 152, 154 includes a first shaft 160, a second shaft 162, and a plurality of fingers (or links) 164 coupled to shafts 160, 162 for pivotable movement relative thereto, as shown, for example, in FIGS. 5 and 6. Each first shaft 160 extends through a pair of bearings 166 (e.g., pillow block bearings) included in each hand 152, 154. Bearings 166 of first hand 152 are coupled to fixed platen 128 for pivotable movement of first hand 152 relative thereto. Bearings 166 of second hand 154 are coupled to movable platen 134 for pivotable movement of second hand 154 relative thereto. First and second shafts 160, 162 extend through fingers 164. Fingers 164 are keyed to first shafts 160. It is within the scope of this disclosure for fingers 164 not to be keyed to first shafts 160.

Each hand 152, 154 includes plurality of stabilizer links 167 to promote stability of hand 152, 154, as shown, for example, in FIG. 6. Stabilizer links 167 are coupled to shafts 160, 162 for pivotable movement relative thereto. Illustratively, each hand 152, 154 includes four stabilizer links 167, two toward each side of fingers 164. A fastener 170 is used to couple one of stabilizer links 167 to an end of each second shaft 162.

Hand coupler 156 includes a plurality of coupler links 168, as shown, for example, in FIG. 6. Coupler links 168 are coupled to second shafts 162 for pivotable movement relative thereto. Illustratively, hand coupler 156 includes four coupler links 168, two toward each side of fingers 164. Coupler links 168, stabilizer links 167, and fingers 164 are made of, for example, ultra high molecular weight plastics material (e.g., polyethylene).

Figure 11:
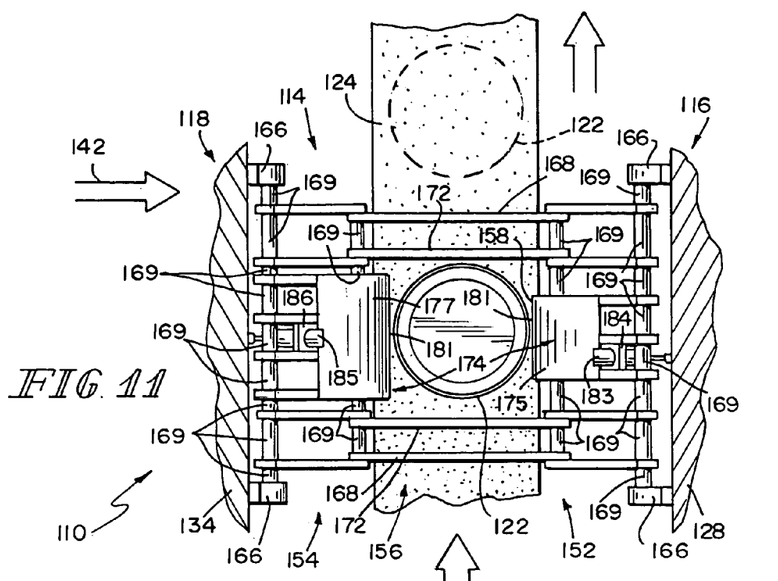
FIG. 11 is a plan view showing the part catcher of FIG. 10 in the release position.

Spacer sleeves 169 are used to space fingers 164, stabilizer links 167, and coupler links 168 apart from one another, as shown, for example, in FIGS. 6, 9, and 11. Spacer sleeves 169 are positioned on shafts 160, 162 between adjacent fingers 164 and links 167, 168. Spacer sleeves 169 thus also minimize corrosion of shafts 160, 163 which are made of, for example, cold-rolled steel. Spacer sleeves 169 are made of a relatively low friction material to facilitate movement of part catcher 114 between the catch and release positions. The material of spacer sleeves 169 is, for example, an acetal resin such as DELRIN®.

Fingers 164 of first and second hands 152, 154 cooperate to catch and release part 122, as shown, for example, in FIGS. 8–11. In the catch position, fingers 164 of hands 152, 154 catch part 122 discharged from machine 112. In the release position, fingers 164 cooperate to form release opening 158 therebetween for movement therethrough of part 122 to underlying part receiver 124. When part catcher 114 returns to the catch position, fingers 164 close release opening 158.

Illustratively, first hand 152 include three fingers 164 and second hand 154 includes four fingers 164, as shown, for example, in FIGS. 6, 9, and 11. Each finger 164 of first hand 152 extends between adjacent fingers 164 of second hand 154 to promote retention of part 122 on hands 152, 154 when part catcher 114 is positioned in the catch position. It is within the scope of this disclosure for fingers 164 of first hand 152 to be spaced relative to fingers 164 of second hand 154 so that each finger 164 of first hand 152 does not extend between adjacent fingers 164 of second hand 154.

Part catcher 114 includes a part retainer 171, as shown, for example, in FIG. 5. Part retainer 171 is adapted to retain part 122 on hands 152, 154 when part catcher 114 is positioned in the catch position.

Part retainer 171 includes a pair of spaced-apart part retention panels 172. Each part retention panel 172 is coupled to one of coupler links 168 and is arranged to engage part 122 to retain part 122 on hands 152, 154 when part catcher 114 is positioned in the catch position. Each part retention panel 172 includes a window 173 made of, for example, a transparent material (e.g., plastics material such as LEXAN®) to facilitate viewing of part 122.

First and second hands 152, 154 cooperate to provide a part orienter 174, as shown, for example, FIGS. 5 and 7–11.

Part orienter 174 is adapted to orient part 122 for release through release opening 158. Part orienter 174 is adapted to move part 122 from a catch position orientation shown in FIGS. 8 and 9 and associated with the catch position to a release position orientation shown in FIGS. 10 and 11 and associated with the for movement of part 122 through release opening 158 upon movement of first and second hands 152, 154 from the catch position to the release position.

Part orienter 174 includes a smaller part orientation wall 175, a smaller wall mount 176, a larger part orientation wall 177, and a larger wall mount 178, as shown, for example, in FIG. 6. Smaller part orientation wall 175 is coupled to smaller wall mount 176 which is coupled to at least two fingers 164 of first hand 152. Larger part orientation wall 177 is coupled to larger wall mount 178 which is coupled to at least two fingers 164 of second hand 154.

Smaller wall mount 176 includes a pair of support walls 179 extending from the two fingers 164 of first hand 152 to which mount 176 is coupled, as shown, for example, in FIG. 6. Support walls 179 are curved to mate with smaller part orientation wall 175 for support thereof. Illustratively, each support wall 179 and the finger 164 to which it is coupled cooperate to form a monolithic unit. It is within the scope of this disclosure for a support wall 179 to be coupled to each finger 164 of first hand 152.

Larger wall mount 178 includes a pair of support walls 180 extending from the two fingers 164 of second hand 154 to which mount 178 is coupled, as shown, for example, in FIG. 6. Support walls 180 are curved to mate with larger part orientation wall 177 for support thereof. Illustratively, each support wall 180 and the finger 164 to which it is coupled cooperate to form a monolithic unit. It is within the scope of this disclosure for a support wall 180 to be coupled to each finger 164 of second hand 154.

Figure 10:
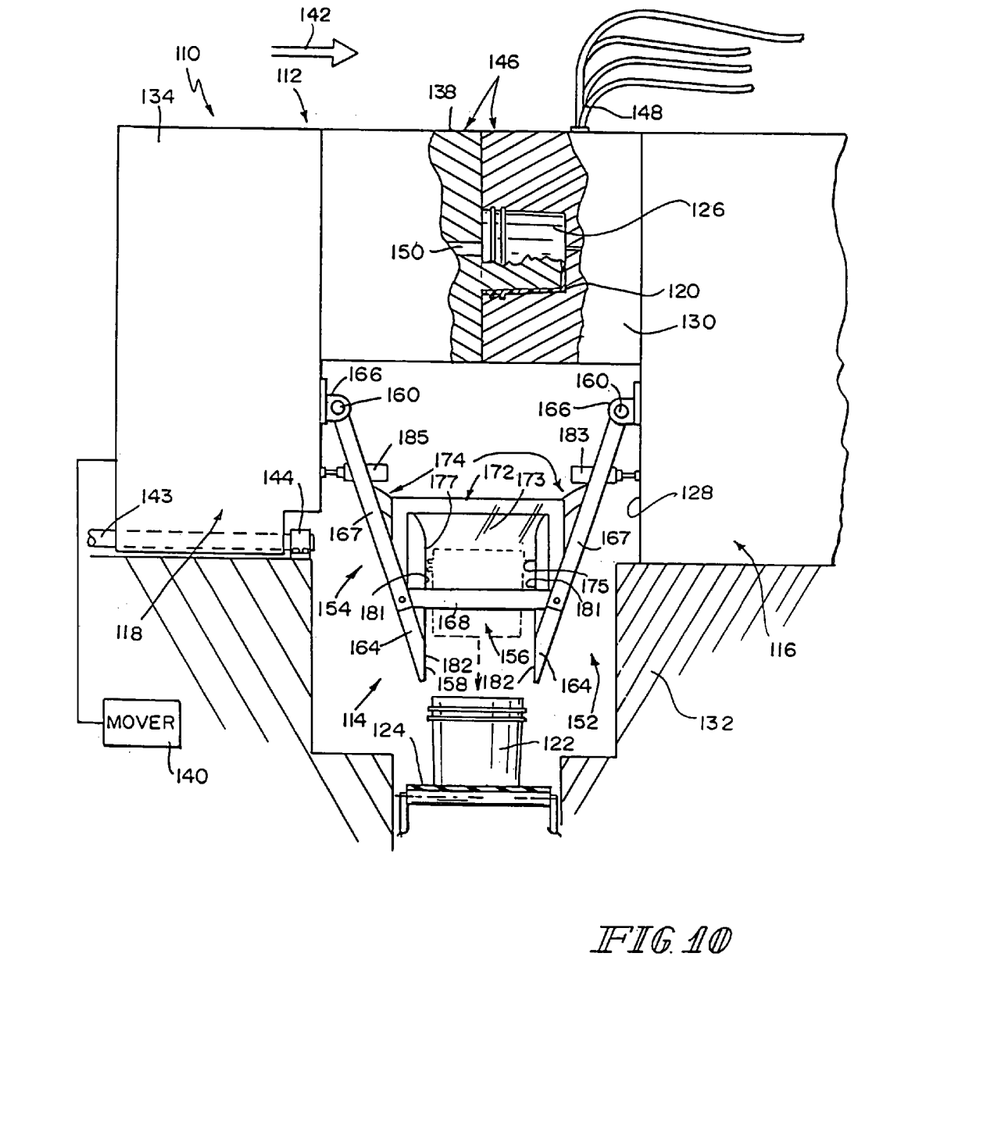
FIG. 10 is an elevation view of the injection mold machine, with portions broken away, showing the movable unit moved to assume the closed position and the part catcher moved to assume a release position to release the part to an underlying part receiver in response to movement of the movable unit to the closed position.

Each part orientation wall 175, 177 includes a guide surface 181 to guide movement of part 122, as shown, for example, in FIGS. 10 and 11. Guide surfaces 181 are non-vertical when hands 152, 154 assume the catch position. Guide surfaces 181 are vertical and face one another to orient part 122 for movement through release opening 158 when hands 152, 154 assume the release position. Fingers 164 include tapered end portions 182 that are aligned with guide surfaces 181 to facilitate movement of part 122 through release opening 158.

Part catcher 114 includes a first shock absorber 183, first absorber mount 184, a second shock absorber 185, and a second absorber mount 186 as shown, for example, in FIG. 6. First shock absorber 183 is coupled to first absorber mount 184 which is coupled to adjacent fingers 164 of first hand 152. Second shock absorber 185 is coupled to second absorber mount 186 which is coupled to adjacent fingers 164 of second hand 154. First shock absorber 183 is arranged to engage fixed platen 128 and second shock absorber 185 is arranged to engage movable platen 134 to minimize over-swinging of part catcher 114 upon movement of part catcher 114 from the catch position to the release position. Minimizing such over-swinging facilitates release of part 122 onto part receiver 124 and minimizes potential damage to part catcher 114 that might otherwise occur upon impact between part catcher 114 and platens 128, 134. Illustratively, each shock absorber 183, 185 is a hydraulic cylinder. It is within the scope of this disclosure to omit from part catcher 114 one or both of shock absorbers 183, 185 and their associated mounts 184, 186.

Figure 12:
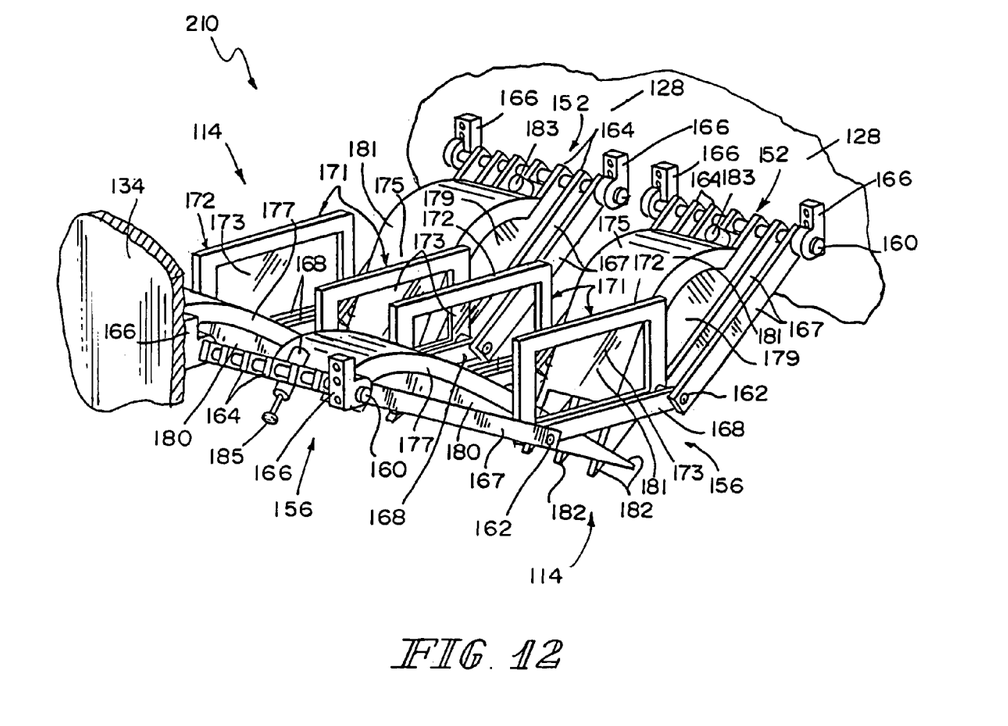
FIG. 12 is a perspective view showing two part catchers coupled to fixed and movable units included in an injection mold machine configured to mold simultaneously two parts shown in FIGS. 13 and 14.
Figure 13:
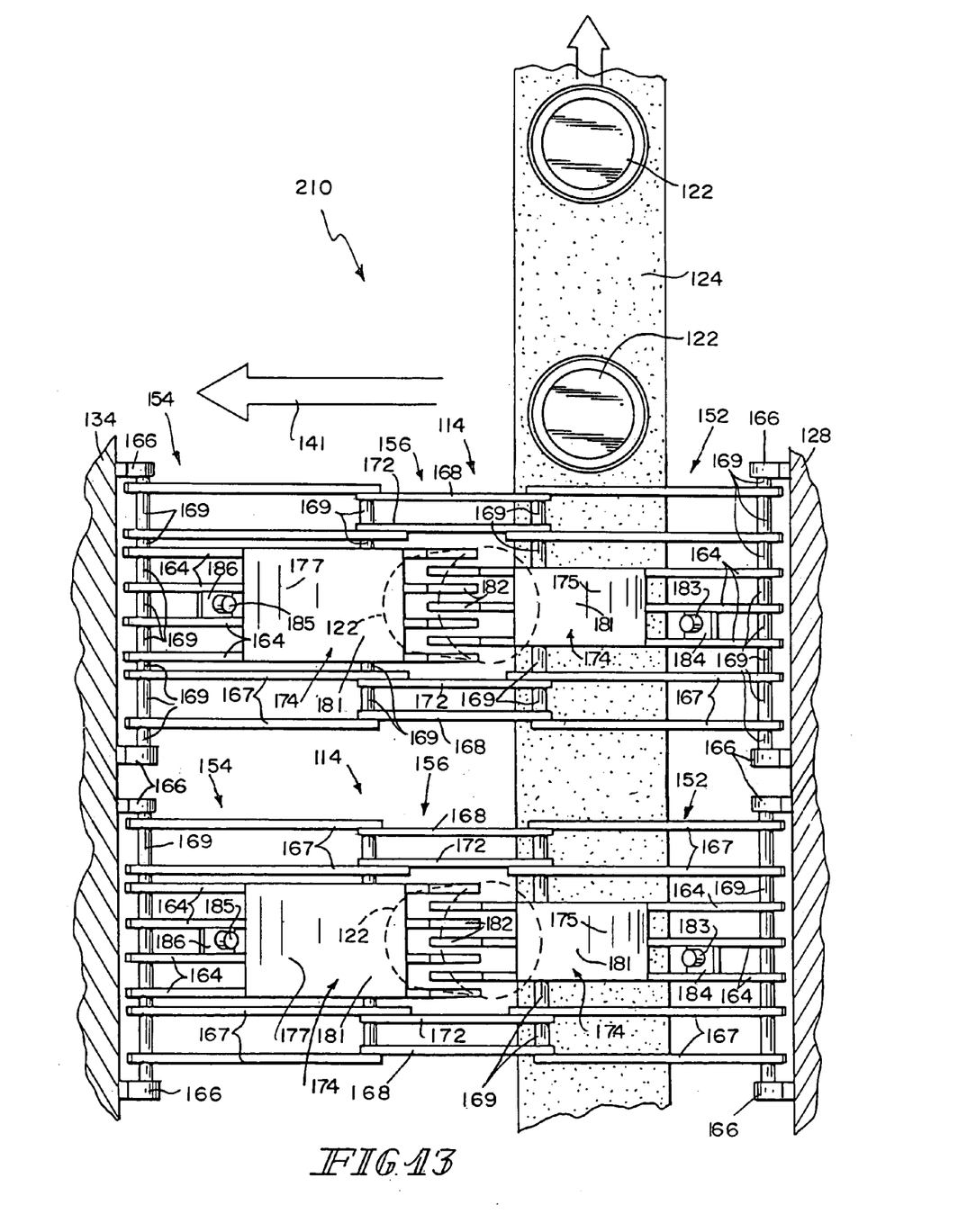
FIG. 13 is a plan view showing the two part catchers of FIG. 12 in a catch position to catch two parts discharged from the injection mold machine.
Figure 14:
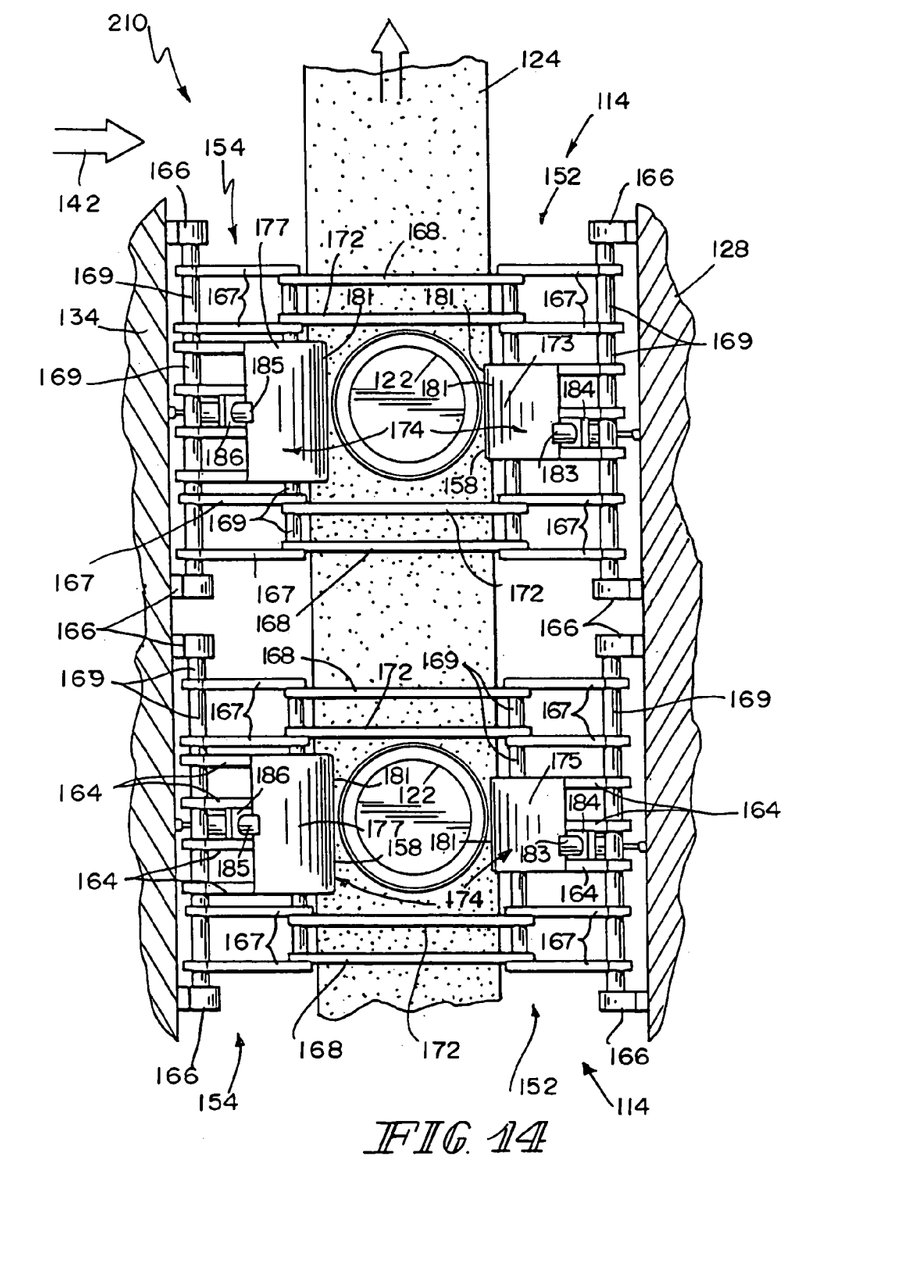
FIG. 14 is a plan view showing the two part catchers of FIGS. 12 and 13 in a release position to release the two parts caught thereby.

An apparatus 210 is an another example of apparatus 10 and is shown, for example, in FIGS. 12–14. Apparatus 210 is similar to apparatus 110 except that it includes two part catchers 114 to catch two parts 122 discharged from two molds 146 of injection mold machine 112 and to release the two parts 122 to underlying part receiver 124. Components of apparatus 210 similar in structure and function to components of apparatus 110 are thus identified by identical reference numbers.

Part catchers 114 are coupled to fixed and movable units 116, 118 for movement with one another between the catch and release positions in response to movement of movable unit 118 relative to fixed unit 116 between the opened and closed positions. In the catch position, each part catcher 114 is arranged to catch a part 122 discharged from one of two molds 146, as shown, for example, in FIGS. 12 and 13. In the release position, each part catcher 114 is arranged to release a part 122 caught thereby through a release opening 158 formed between hands 152, 154 of each part catcher 114 to underlying part receiver 124. First hands 152 are coupled to fixed platen 128 for pivotable movement relative thereto. Second hands 154 are coupled to movable platen 134 for pivotable movement relative thereto. Part catchers 114 provide catcher means for catching a part 122 discharged from injection mold machine 112 when the catcher means is positioned in a catch position and for releasing a part 122 to part receiver 124 when the catcher means is positioned in a release position.

It is within the scope of this disclosure for apparatus 210 to have more than two part catchers 114 to catch and release more than two parts 122. It is within the scope of this disclosure for first shafts 160 of first hands 152 of part catchers 114 to be replaced by a single shaft extending through only three bearings 166 and for first shafts 160 of second hands 154 of part catchers 114 to be replaced by a single shaft extending through only three bearings 166. It is within the scope of this disclosure for second shafts 162 of first hands 152 of part catchers 114 to be replaced by a single shaft and for second shafts 162 of second hands 154 of part catchers 114 to be replaced by a single shaft. It is further within the scope of this disclosure to omit one or more stabilizer links 167 and one or more coupler links 168 from part catchers 114 when first shafts 160 are replaced by a single shaft and second shafts 162 are replaced by a single shaft.

The invention claimed is:

1. An apparatus comprising
an injection mold machine including a fixed unit and a movable unit arranged to move relative to the fixed unit between a closed position closing the injection mold machine so that the fixed and movable units cooperate to form a mold cavity therebetween to mold plastics material in the mold cavity into a part and an opened position opening the injection mold machine for discharge of the part therefrom,
a part receiver, and
catcher means for catching the part discharged from the injection mold machine when the catcher means is positioned in a catch position, for lowering the part from the catch position to a release position and for releasing the part to the part receiver when the catcher means is positioned in a release position, the catcher means being coupled to the fixed unit and the movable unit for movement relative to the fixed and movable units from the catch position to the release position in response to movement of the movable unit relative to the fixed unit from the opened position to the closed position and for movement relative to the fixed and movable units from the release position to the catch position in response to movement of the movable unit relative to the fixed unit from the closed position to the opened position.

2. The apparatus of claim 1, wherein the fixed unit includes a fixed platen and a fixed mold body coupled to the fixed platen, the movable unit includes a movable platen and a movable mold body coupled to the movable platen for movement therewith, the fixed and movable mold bodies cooperate to provide a mold formed to include the mold cavity when the fixed and movable units are positioned in the closed position, the catcher means is coupled to the fixed and movable platens for pivotable movement relative thereto between the catch and release positions, and
wherein the catcher means further includes orientation means for orienting the part prior to releasing the part.

3. The apparatus of claim 1, wherein the catcher means includes a first hand coupled to the fixed unit for pivotable movement relative thereto, a second hand coupled to the movable unit for pivotable movement relative thereto, and a hand coupler coupled to the first and second hands for pivotable movement of the first and second hands between the catch position in which the first and second hands cooperate to catch a part discharged from the injection mold machine and the release position in which the first and second hands cooperate to form a release opening therebetween for release therethrough of the part caught by the first and second hands.

4. The apparatus of claim 3, wherein the first and second hands and the hand coupler cooperate to provide a linkage coupled to the fixed and movable units to move between the catch position and the release position.

5. The apparatus of claim 3, wherein each of the first and second hands includes a plurality of fingers, a first pivot shaft, and a second pivot shaft, the first pivot shaft of the first hand is coupled to the fingers of the first hand and the fixed unit for pivotable movement of the fingers of the first hand relative to the fixed unit, the second pivot shaft of the first hand is coupled to the fingers of the first hand and the hand coupler for pivotable movement between the fingers of the first hand and the hand coupler, the first shaft of the second hand is coupled to the fingers of the second hand and the movable unit for pivotable movement of the fingers of the second hand relative to the movable unit, and the second pivot shaft of the second hand is coupled to the fingers of the second hand and the hand coupler for pivotable movement between the fingers of the second hand and the hand coupler.

6. The apparatus of claim 1, wherein the catcher means includes a first part catcher and a second part catcher, the first and second part catchers are coupled to the fixed and movable units for movement with one another between the catch position in which each part catcher is arranged to catch a part discharged from the injection mold machine and the release position in which each part catcher is arranged to release the part caught thereby to a conveyor that is included in the part receiver and underlies the first and second part catchers.

7. An apparatus comprising
a mold machine including a first unit and a second unit, the first and second units being arranged for relative movement between one another between a closed position closing the mold machine so that the first and second units cooperate to form a mold cavity therebetween to mold material in the mold cavity into a part and an opened position opening the mold machine for discharge of the part therefrom,
a part catcher coupled to the first and second units for movement relative to the first and second units between a catch position arranged to catch the part discharged from the mold machine and a release position arranged to release the part caught by the part catcher in response to relative movement between the first and second units between the opened position and the closed position, the part catcher includes a first hand coupled to the first unit for pivotable movement relative thereto, a second hand coupled to the second unit for pivotable movement relative thereto, and wherein the first hand and second hand each comprise spaced fingers for catching and releasing the part.

8. The apparatus of claim 7, wherein the part catcher is arranged for pivotable movement relative to the first and second units from the release position to the catch position in response to relative movement between the first and second units from the closed position to the opened position and is arranged for pivotable movement relative to the first and second units from the catch position to the release position in response to relative movement between the first and second units from the opened position to the closed position, and wherein at least one finger of the first hand extends between adjacent fingers of the second hand when the part catcher is in the catch position.

9. The apparatus of claim 7, wherein a hand coupler is coupled to the first and second hands for pivotable movement of the first hand relative to the first unit and the second hand relative to the second unit between the catch position in which the first and second hands cooperate to catch a part discharged from the mold machine and the release position in which the first and second hands cooperate to release the part caught thereby.

10. The apparatus of claim 9, wherein the first unit includes a first platen and a first mold body coupled to the first platen, the second unit includes a second platen and a second mold body coupled to the second platen for movement therewith, the first and second mold bodies cooperate to provide a mold formed to include the mold cavity when the first and second units are positioned in the closed position, the first hand is coupled to the first platen for pivotable movement relative thereto, and the second hand is coupled to the second platen for pivotable movement relative thereto.

11. The apparatus of claim 10, wherein the part catcher includes a shock absorber coupled to the first hand to engage the first platen when the part catcher is moved from the catch position to the release position.

12. The apparatus of claim 9, wherein each of the first and second hands includes a first pivot shaft, a second pivot shaft, and a plurality of fingers coupled to the first and second pivot shafts, the first pivot shaft of the first hand is coupled to the first unit for pivotable movement of the first hand relative to the first unit, the first pivot shaft of the second hand is coupled to the second unit for pivotable movement of the second hand relative to the second unit, the hand coupler includes a pair of links coupled to the second pivot shafts for pivotable movement relative thereto, and the fingers of the first and second hands are positioned between the links of the hand coupler.

13. The apparatus of claim 12, wherein the part catcher includes part retention panels coupled to each link and the part retention panels are spaced apart from one another to retain the part therebetween when the part catcher is positioned in the catch position.

14. The apparatus of claim 12, wherein each hand includes a wall mount and a part orientation wall coupled to the wall mount, the wall mount of the first hand is coupled to at least two of the fingers of the first hand, the wall mount of the second hand is coupled to at least two of the fingers of the second hand, each part orientation wall includes a guide surface, and the guide surfaces are non-vertical when the first and second hands assume the catch position and are vertical and face one another to orient a part caught by the part catcher for movement through a release opening formed between the first and second hands when the part catcher assumes the release position.

15. The apparatus of claim 7, further comprising a second part catcher coupled to the first and second units for movement with the other part catcher relative to the mold machine between a catch position arranged to catch a second part discharged from the mold machine and a release position arranged to release the second part in response to relative movement between the first and second units between the opened position and the closed position, and wherein the first hand and second hand each comprise a different number of spaced fingers.

16. A part catcher for use with a mold machine including first and second units arranged for relative movement between one another between a closed position closing the mold machine so that the first and second units cooperate to form a mold cavity therebetween to mold material in the mold cavity into a part and an opened position opening the mold machine for discharge of the part therefrom, the part catcher comprising a first hand adapted to be coupled to the first unit for movement relative thereto, the first hand comprising a plurality of fingers, a second hand adapted to be coupled to the second unit for movement relative thereto, the second hand comprising a plurality of fingers, and a hand coupler coupled to the first and second hands for movement of the first and second hands relative to one another and to the first and second units from a catch position arranged to catch a part discharged from the mold cavity to a release position arranged to provide a release opening between the first hand fingers and the second hand fingers to release the part caught by the first and second hands in response to relative movement between the first and second units from the opened position to the closed position and for movement of the first and second hands relative to one another and to the first and second units from the release position to the catch position in response to relative movement between the first and second units from the closed position to the opened position.

17. The part catcher of claim 16, wherein, in the release position, the first and second hands cooperate to form a release opening therebetween for movement therethrough of a part caught by the part catcher and, in the catch position, the first and second hands cooperate to close the release opening.

18. The apparatus of claim 17, wherein the first and second hands cooperate to provide a part orienter adapted to move a part caught by the part catcher from a catch position orientation to a release position orientation for movement of the part through the release opening upon movement of the first and second hands from the catch position to the release position.

19. The apparatus of claim 16, further comprising a part retainer coupled to opposite sides of each of the first and second hands to retain a part caught by the part catcher on the first and second hands when the part catcher is positioned in the catch position.

20. The apparatus of claim 16, further comprising a pair of part retention panels and first and second shock absorbers, wherein each hand includes a first pivot shaft, a second pivot shaft, a plurality of fingers coupled to the first and second pivot shafts, and a plurality of spacer sleeves surrounding the first and second pivot shafts to space the fingers apart from one another, the first pivot shaft of the first hand is adapted to be coupled to a platen included in the first unit for pivotable movement relative thereto, the first pivot shaft of the second hand is adapted to be coupled to a platen included in the second unit for pivotable movement relative thereto, each finger of the first hand extends between a pair of the fingers of the second hand when the hands are positioned in the catch position, the hand coupler includes a pair of links coupled to the second pivot shafts for pivotable movement relative thereto, the fingers of the first and second hands are positioned between the links, each part retention panel is coupled to one of the links so that the part retention panels are spaced apart from one another to retain a part therebetween on the hands when the hands are positioned in the catch position, each hand includes a wall mount and a part orientation wall coupled to the wall mount, the wall mount of the first hand is coupled to at least two of the fingers of the first hand, the wall mount of the second hand is coupled to at least two of the fingers of the second hand, each part orientation wall includes a guide surface, the guide surfaces are non-vertical when the hands assume the catch position and are vertical and face one another to orient a part caught by the hands for movement through a release opening formed between the hands when the hands assume the release position, the first shock absorber is coupled to the first hand for engagement with the platen included in the first unit, and the second shock absorber is coupled to the second hand for engagement with the platen included in the second unit.

21. The apparatus of claim 13, further comprising sloped orientation means between the retention panels for orienting the part prior to the part being released at the release position.

* * * * *